United States Patent [19]

Egawa et al.

[11] Patent Number: 5,837,097

[45] Date of Patent: Nov. 17, 1998

[54] DEINKING AGENT FOR REGENERATING WASTE PAPER AND METHOD FOR DEINKING WASTE PAPER

[75] Inventors: Junta Egawa, Chiba; Yoko Takubo, Tokyo; Kohji Masamizu, Kanagawa, all of Japan

[73] Assignee: Lion Corporation, Tokyo, Japan

[21] Appl. No.: 701,955

[22] Filed: Aug. 23, 1996

[30] Foreign Application Priority Data

Dec. 20, 1995 [JP] Japan ..................................... 7-331683

[51] Int. Cl.$^6$ ....................................................... D21C 5/02
[52] U.S. Cl. .............................................. 162/5; 510/174
[58] Field of Search ............................ 162/5, 4; 510/174

[56] References Cited

U.S. PATENT DOCUMENTS

| | | | |
|---|---|---|---|
| 4,964,949 | 10/1990 | Hamaguchi et al. | 162/5 |
| 5,281,358 | 1/1994 | Urushibata et al. | 510/174 |
| 5,302,243 | 4/1994 | Ishibashi et al. | 162/5 |
| 5,417,808 | 5/1995 | Okamoto et al. | 162/5 |
| 5,460,695 | 10/1995 | Kato | 162/5 |
| 5,505,817 | 4/1996 | Rodriguez et al. | 162/5 |

FOREIGN PATENT DOCUMENTS

| | | | |
|---|---|---|---|
| Sho 59-9299 | 1/1984 | Japan . | |
| HEI 2-80683 | 4/1984 | Japan | 162/5 |
| Sho 63-59494 | 3/1988 | Japan . | |
| 2-80684 | 3/1990 | Japan . | |
| 3-882 | 1/1991 | Japan . | |
| 7-145584 | 6/1995 | Japan . | |
| 2 231 595 | 11/1990 | United Kingdom . | |
| WO 94/19532 | 1/1994 | WIPO . | |

OTHER PUBLICATIONS

Prassad et al. "Enzyme deinking of black and white letterpress printed newsprint waste", Progress in paper recycling, pp. 21–30, May 1992.

*Primary Examiner*—Stanley S. Silverman
*Assistant Examiner*—Jose A. Fortuna
*Attorney, Agent, or Firm*—Morrison & Foerster LLP

[57] ABSTRACT

A deinking agent for regenerating waste paper is provided, which can efficiently remove ink particles from the pulp fiber and obtain the regenerated pulp having a high brightness degree and a low content of residual ink. The deinking agent for regenerating waste paper comprises an enzyme and a compound represented by the general formula; $R^1O$—$(PO)x$—$[(EO)y$—$(AO)z]$—$H$ (wherein $R^1$ represents alkyl group or alkenyl group having 8—24 normal or branched chain carbon atoms; PO represents propylene oxide unit; EO represents ethylene oxide unit; AO represents alkylene oxide unit having not less than 3 carbon atoms; x and z represent respectively an integer of not less than 1 and satisfy the following formula, $10 \leq x+z \leq 100$; y is an integer satisfying the following formula, $10 \leq y \leq 100$; PO is added in the form of block configuration; and EO and AO are added in the form of block or random configuration).

10 Claims, No Drawings

DEINKING AGENT FOR REGENERATING WASTE PAPER AND METHOD FOR DEINKING WASTE PAPER

FIELD OF THE INVENTION

The present invention relates to a deinking agent for the preparation of a high quality regenerated pulp from printed waste paper and a method for deinking.

BACKGROUND OF THE INVENTION

Deinking agents have previously been employed in regenerating printed waste paper to obtain regenerated pulp. Recently, the regeneration of printed waste paper has become increasingly important from the viewpoint of saving natural resources and environmental protection. Consequently, regenerated pulp has widely been used in various fields.

The regeneration of printed waste paper is generally carried out by using a disintegrator such as a pulper. More specifically, printed waste paper is defibered by a mechanical force while an alkaline agent, a deinking agent and, if necessary, bleaching agent acted on the pulped waste paper to detach ink particles from the waste paper. The ink particles are removed from the pulp slurry by, e.g, a flotation method and/or a washing method. The pulp slurry was then made into "regenerated" paper.

Inks and printing methods for newspaper have been improved in order to speed up printing operations, obtain a beautifully printed newspaper, and obtain a newspaper free from ink staining. For this reason, inks are strongly adhered to paper, thus making a deinking operation more difficult. In particular, it has become increasingly difficult to obtain regenerated pulp having a high brightness degree through the use of deinking methods of the prior art.

Under such circumstances, in order to improve the deinking effect, the amount of an alkali or hydrogen peroxide has been increased to swell pulp fibers or to hydrolyze printing inks. On the other hand, a deinking agent containing enzymes for regenerating waste paper has also been suggested. (For example, Japanese Laid Open Patent No. (Tokkai-Shou) 59-9299, No.(Tokkai-Shou) 63-59494, No. (Tokkai-Hei) 2-80684, No.(Tokkai-Hei) 7-145584 and No. (Tokkai-Hei) 03-882, which are incorporated herein by reference.)

However, the method of increasing alkaline agent or hydrogen peroxide has certain limitations. For example, there has been arising a problem of yellowing in pulp due to the action of an alkaline agent. On the other hand, the use of a neutral enzyme is not sufficient for removing ink particles from pulp fibers and accordingly does not provide regenerated pulp having a low content of residual inks. Thus this method also cannot live up to the expected effect.

Moreover, in the case where a general surface active agent which is known as a deinking agent is used in combination with an enzyme, an enzyme activity is extremely inhibited so that the deinking effect could not be obtained as has been expected.

SUMMARY OF THE INVENTION

The present invention seeks to solve the above-mentioned problems of the prior art and to provide a deinking agent for the preparation of regenerated pulp having a high brightness degree and a low content of residual inks by efficiently removing ink particles from the pulp fiber. The present invention also relates to a method of using the deinking agent.

A compound is made by adding propylene oxide into hydrophobic group having a specific structure in the form of block configuration and further adding ethylene oxide and hydrophobic alkylene oxide therein. When this compound is used in combination with an enzyme, a synergistic effect can be obtained in detaching ink particles from the pulp. The present invention has been developed on the basis of the above-mentioned findings.

According to one aspect of the present invention, a deinking agent for regenerating of waste paper comprises an enzyme and a compound represented by the following general formula (1);

$$R^1O-(PO)x-[(EO)y-(AO)z]-H \quad (1)$$

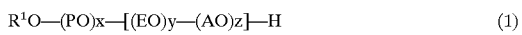

wherein $R^1$ represents alkyl group or alkenyl group having 8–24 straight or branched chain carbon atoms; PO represents propylene oxide unit; EO represents ethylene oxide unit; AO represents alkylene oxide unit having not less than three carbon atoms; x and z represent respectively an integer of not less than 1 and satisfy the following formula, $10 \leq x+z \leq 100$; y is an integer satisfying the following formula, $10 \leq y \leq 100$; PO is added in the form of block configuration; and EO and AO are added in the form of block or random configuration.

It is preferable in the above-mentioned deinking agent that the enzyme to be used for the deinking agent is at least one selected from the group consisting of cellulase, hemicellulase, lipase, amylase, xylanase and protease.

It is preferable in the above-mentioned deinking agent that the form of the enzyme is at least one selected from the group consisting of powdery, granular, solid supported by a carrier and liquid.

It is preferable in the above-mentioned deinking agent that $R^1$ of the general formula (1) has carbon atoms in the range of 12 to 22.

It is preferable in the above-mentioned deinking agent that AO of the general formula (1) is one oxide selected from the group consisting of propylene oxide, butylene oxide, butadiene monooxide, hexylene oxide, styrene oxide and α-olefin oxide.

It is preferable in the above-mentioned deinking agent that x is in the range of 2 to 20, y is in the range of 15 to 50 and z is in the range of 10 to 50.

It is preferable in the above-mentioned deinking agent that x+z is in the range of 12 to 60 and y is in the range of 15 to 40.

It is preferable in the above-mentioned deinking agent that the mixing ratio of the enzyme to the ether compound represented by the general formula (1) is in the range of 2:98 to 91:9 based on weight.

According to another aspect of the present invention, a method for deinking waste paper in the presence of a deinking agent comprises an enzyme and a compound represented by the following general formula (2);

$$R^1O-(PO)x-[(EO)y-(AO)z]-H \quad (2)$$

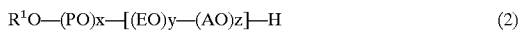

wherein $R^1$ represents alkyl group or alkenyl group having 8–24 straight or branching chain carbon atoms; PO represents propylene oxide unit; EO represents ethylene oxide unit; AO represents alkylene oxide unit having not less than three carbon atoms; x and z represent respectively an integer of not less than 1 and satisfy the following formula, $10 \leq x+z \leq 100$; y is an integer satisfying the following formula, $10 \leq y \leq 100$; PO is added in the form of block configuration; and EO and AO are added in the form of block or random configuration.

It is preferable in the above-mentioned method that the deinking is carried out at a pH ranging from 3 to 8.

It is preferable in the above-mentioned method that the amount of the enzyme to be used ranges from 0.002 to 3 wt. % per dry weight of the waste paper.

It is preferable in the above-mentioned method that the amount of the enzyme to be used ranges from 0.02 to 1 wt. % per dry weight of a waste paper.

It is preferable in the above-mentioned method that the amount of the ether compound represented by the general formula (2) ranges from 0.01 to 5 wt. % per dry weight of a waste paper.

It is preferable in the above-mentioned method that the ratio of the enzyme to the ether compound represented by the foregoing general formula (2) ranges from 2:98 to 91:9 based on weight.

It is preferable in the above-mentioned method that the deinking further comprises a pulping stage, an aging stage and a flotation stage, and the deinking agent is added at the time of at least one stage selected from the group consisting of the pulping stage, the aging stage and before the flotation stage.

It is preferable in the above-mentioned method that the pulping stage is carried out at a pulp concentration ranging from 4 to 25 wt. %, at temperatures ranging from 20° to 70° C. and at a pH ranging from 3 to 8, while alkaline agent is further added.

It is preferable in the above-mentioned method that the aging stage is carried out at a pulp concentration ranging from 10 to 30 wt. % and at temperatures ranging from 30° to 80° C. for not less than one hour.

It is preferable in the above-mentioned method that the flotation stage comprises removing the detatched ink particles from the pulp slurry at a pulp concentration ranging from 0.5 to 2.5 wt. % and at a temperature ranging from 20° to 50° C.

It is preferable in the above-mentioned method that the enzyme is at least one selected from the group consisting of cellulase and amylase.

It is preferable in the above-mentioned method that other than the deinking agent of the present invention mentioned above, at least one compound can be added, which is selected from the group consisting of polyoxy alkylene alkyl ether sulfate, alkylbenzene sulfonate, $\alpha$-olefin sulfonate, fatty acid or its salt, alkyl phenol/alkylene oxide adducts, fatty acid/alkylene oxide adducts, fats and oils/alkylene oxide adducts, ester compound made by triethanol amine and fatty acid/alkylene oxide adducts, quaternized ester compound made by triethanol amine and fatty acid/alkyene oxide adducts, rosin acid/alkylene oxide adducts, formaline condensing agent of alkyl phenol/alkylene oxide adducts, monostearyl glyceride/alkylene oxide adducts, trigriceride/alkylene oxide adducts and pentaerythritol di fatty ester/alkylene oxide adducts.

As stated above, the deinking agent for regenerating waste paper of the present invention permits efficient removal of ink from pulp fiber and obtaining regenerated pulp having a high brightness degree and a low content of residual inks by the use of synergistic effect of an enzyme and a compound represented by the foregoing general formula (1). In particular, the deinking agent of the present invention can effectively work with wood free paper, newspaper, leaflet or magazine.

Enzymes usable in the present invention include a mixture containing one or not less than two compounds selected from the group consisting of cellulase, hemicellulase, lipase, amylase, xylanase and protease. Enzymes derived from various sources can be used in the present invention. Moreover, any form of an enzyme such as, powdery, granular, solid including solid supported by a carrier and liquid can be employed.

Among these enzymes, cellulase is the most preferable. Cellulase is known as hydrolase breaking a $\beta1\rightarrow4$ glucoside linkage of cellulase. In general, a cellulase shows the activity at a pH ranging from 3 to 8.

A compound to be used in combination with other enzymes is an ether compound represented by the foregoing general formula (1). The ether compound is made by the following steps: for example, propylene oxide is added in a higher alcohol having 8–24 carbon atoms; ethylene oxide is added in the end hydroxy group; and XO which is an alkylene oxide having not less than 3 carbon atoms is further added therein. The ether compound can also be made as follows: propylene oxide is added into a higher alcohol having 8–24 carbon atoms; and then a mixture of ethylene oxide and XO which is alkylene oxide having not less than 3 carbon atoms is added into the end hydroxy group thereof.

Compared with surface active agents that have been traditionally used as a deinking agent, the ether compounds used in the present invention cause less deterioration in enzymatic activity.

In the foregoing general formula (1), R1 represents a group derived from a higher alcohol having 8–24, more preferably 12–22, straight or branched chain carbon atoms. AO represents alkylene oxide such as propylene oxide, butylene oxide, butadiene monooxide, hexylene oxide, styrene oxide and $\alpha$-olefin oxide. Among these, alkylene oxide having 3–30 carbon atoms is preferably employed. More preferably, propylene oxide or butylene oxide are employed. The configurations of EO and AO may be block or random.

In the foregoing general formula (1), x+z is in the range of 10–100, and y is in the range of 10–100. Furthermore, if x is in the range of 2–20, y is in the range of 15–50 and z is in the range of 10–50, regenerated waste paper having a higher brightness degree and a lower content of residual inks can be provided. In particular, it is preferable that x+z be in the range of 12–60, more preferably 12–50 and y be in the range of 15–40, more preferably 18–40.

In the present invention, the amount of the enzyme and the ether compound represented by the foregoing general formula (1), may be optically decided. However, it is preferable that the amount of the enzyme to be used ranges from 0.002 to 3 wt. %, more preferably 0.02 to 1 wt. %, per dry weight of the waste paper. It is preferable that the amount of the ether compound represented by the general formula (1) ranges from 0.01 to 5 wt. %, more preferably 0.1 to 1.0 wt. %, per dry weight of the waste paper. Moreover, the ratio of the enzyme to the ether compound represented by the foregoing formula (1) may also be optionally decided. However, it is preferable that the ratio ranges from 2:98 to 91:9 based on weight.

If the deinking comprises either a pulping or an aging stage, the deinking agent of the present invention may be added separately in the pulping stage and/or the aging stage. The deinking agent of the present invention can also be used in the general deinking method before a flotation stage. Methods for deinking printed waste paper can roughly be divided into two, one of which is a washing method and the other of which is a flotation method. In general, the deinking method comprises the pulping stage, the aging stage and the washing/flotation stage. The pulping and the aging stage are performed for finely detaching and dispersing ink particles. On the other hand, the washing stage is conducted while ink particles are dispersed as has been stated above. However, in the flotation stage, ink particles dispersed during the pulping stage and the aging stage need to be coagulated. Therefore, the deinking agent used in the flotation method is required to have opposite abilities; an ability of detaching and dispersing ink particles, and an ability of coagulating ink particles. On the other hand, the property of the deinking agent requiring for three stages; pulping, aging and washing stages in the washing method is the same.

However, the foregoing problems can be solved by the use of the deinking agent of the present invention.

In the case where a deinking is conducted by the use of the deinking agent of the present invention, the pulping stage is preferably carried out by using, in addition to the deinking agent of the present invention, an alkaline agent such as sodium hydroxide, sodium silicate, sodium carbonate, and if necessary, bleaching agents, for example, hydrogen peroxide. The pulping stage is preferably carried out at a pulp concentration ranging form 4 to 25 wt. % and at a temperature ranging from 20° to 70° C. and at a pH ranging from 3 to 8. If the pulp concentration is not more than 3 wt. % or the temperature is not more than 20° C., the frictional force among pulp fibers decreases during pulping stage so that the undefibered pulp increases. Consequently, such pulp turns out to be insufficient in manufacturing paper. Moreover, regenerated paper having a low content of residual inks cannot be obtained. On the contrary, the pulp concentration is not less than 25 wt. % or the temperature is not less than 70° C., the frictional force among the pulp fibers can be too high or the strength of the paper can be reduced due to the frictional heat. As a result, high quality regenerated pulp is not provided.

Moreover, the aging stage can be carried out under the same condition as in the pulping stage. The aging stage is preferably carried out at a pulp concentration ranging from 10 to 30 wt. % and at a temperature ranging from 30° to 80° C. for one hour or more. If the pulp concentration is not more than 10 wt. % and the temperature is not more than 30° C., a sufficient aging effect can hardly be obtained, thus making it difficult to obtain a high quality regenerated pulp. Moreover, if the aging stage is conducted at temperatures of not less than 80° C., the strength of paper can be deteriorated due to the heat. Furthermore, in the case where the pulp concentration is not less than 30 wt. %, a sufficient damp and wet condition cannot be obtained, thus making it difficult to obtain the aging effect.

The released ink particles can be efficiently removed from pulp slurry by the flotation carried out at a pulp concentration ranging from 0.5 to 2.5 wt. % and at a temperature ranging from 20° to 50° C.

The deinking method of the present invention may further comprise various stages commonly used in the deinking method such as a dilution and dehydrating stage, a screening stage, a disperser stage and a kneader stage. The above-mentioned stages do not negatively influence the quality of the resulted regenerated pulp and the operativity in the method. The timing when the above-mentioned stage is performed does not limited to during the foregoing pulping stage or the aging stage. The above-mentioned stage can be performed in the ink-separation stage such as kneader, refiner, and disperser stage, or before the flotation stage.

The deinking agent can be used in combination with at least one compound selected from the group consisting of polyoxy alkylene alkyl ether sulfate, alkylbenzene sulfonate, α-olefin sulfonate, fatty acid or its salt, alkyl phenol/alkylene oxide adducts, fatty acid/alkylene oxide adducts, fats and oils/alkylene oxide adducts, ester compound made by triethanol amine and fatty acid/alkylene oxide adducts, quaternized esther compound made by triethanol amine and fatty acid/alkyene oxide adducts, rosin acid/alkylene oxide adducts, formaline condensing agent of alkyl phenol/alkylene oxide adducts, monostearyl glyceride/alkylene oxide adducts, trigriceride/alkylene oxide adducts and pentaerythritol di fatty ester/alkylene oxide adducts.

The present invention will hereinafter be explained in more detail with reference to the following Examples and Comparative Examples.

EXAMPLE 1

After cutting a high quality PPC waste paper (the rate of the area covered with ink is 12 wt. %) into pieces of 4×4 cm, the pieces were introduced into a disintegrator such as a pulper, then an enzyme (cellulase: SP342, product by Novo Bio-Industry Co., Ltd) in an amount of 0.2 wt. %, each compound listed in the Table 1 in an amount of 0.2 wt. % respectively per weight of the raw waste paper were added therein. Warm water was also added therein to control the pulp concentration to 5 wt. %. Heat treatment was then conducted at a temperature of 50° C. for 20 minutes thereto. During this procedure, the pH was controlled so as to be 7. In addition, the produced pulp slurry was aged at a temperature of 50° C. for 60 minutes. Then the produced pulp slurry was washed with water on an 80 mesh sieve to thus remove the ink particles detached from the raw waste paper. Subsequently, the slurry was diluted with water to the concentration of 1 wt. % and formed into a pulp sheet by the use of a TAPPI sheet machine. The ISO brightness degree and number of residual ink particles of the produced pulp sheet was measured and the results were shown in Table 1.

In the present invention, the number of residual ink particles was measured by the following measurement.

In the optional section of the resulted pulp sheet (measured area : 5×5 cm$^2$), the ink particles of not less than 60$\mu$m in diameter were counted and the resulted number was multplied by 400 to evaluate the number of the residual ink particles. The unit is number/m$^2$.

EXAMPLE 2

The same procedures used in Example 1 were conducted except that the diluted sulfric acid was added in order to control the pH to 6 during the pulping stage. The result is shown in Table 1.

EXAMPLE 3–7

The same procedures used in Example 1 were conducted except that the kinds of surface active agents were altered. The results are shown in Table 1.

COMPARATIVE EXAMPLE 1–8

The same procedures employed in Example 1 were conducted except that in the three cases: only enzyme was employed, only surface active agent was employed, and both an enzyme and a surface active agent were employed in combination, where a compound other than that represented by the general formula (1) was employed as a surface active agent. The results are shown in

TABLE 1

| No. | Enzyme | Surface active agent | Configuration | x (mol) | y (mol) | z (mol) | pH | Brightness degree (ISO, %) | Residual ink particles (number/m$^2$) |
|---|---|---|---|---|---|---|---|---|---|
| 1 | SP342 | $C_{18}H_{37}OPO_xEO_yPO_zH$ | Bl | 2 | 20 | 20 | 7 | 84.6 | 260,000 |
| 2 | SP342 | $C_{18}H_{37}OPO_xEO_yPO_zH$ | Bl | 6 | 30 | 20 | 6 | 85.7 | 220,000 |
| 3 | SP342 | $C_{18}H_{37}OPO_xEO_yPO_zH$ | Rm | 2 | 22 | 14 | 7 | 84.3 | 290,000 |
| 4 | SP342 | $C_{18}H_{37}OPO_xEO_yPO_zH$ | Rm | 6 | 22 | 14 | 6 | 85.6 | 230,000 |
| 5 | SP342 | $C_{12}H_{25}OPO_xEO_yPO_zH$ | Bl | 12 | 30 | 30 | 7 | 84.5 | 290,000 |
| 6 | SP342 | $C_{22}H_{45}OPO_xEO_yBO_zH$ | Bl | 2 | 15 | 16 | 6 | 85.5 | 230,000 |
| 7 | SP342 | $C_{18}H_{37}OPO_xEO_yPO_zH$ | Rm | 20 | 40 | 40 | 6 | 84.9 | 270,000 |
| 8 | BAN240L | branched chain $C_{12}H_{25}OPO_xEO_yPO_zH$ | Rm | 4 | 25 | 25 | 7 | 84.2 | 290,000 |
| 1* | SP342 | not used | — | — | — | — | 7 | 82.8 | 600,000 |
| 2* | not used | $C_{18}H_{37}OPO_xEO_yPO_zH$ | Bl | 2 | 20 | 20 | 7 | 83.1 | 340,000 |
| 3* | SP342 | beef tallow di-gliceride-EO/PO adducts | — | — | — | — | 6 | 82.3 | 740,000 |
| 4* | SP342 | $C_{17}H_{35}COOH$ | — | — | — | — | 7 | 82.0 | 800,000 |
| 5* | SP342 | $C_{18}H_{37}OPO_xEO_yPO_zH$ | Bl | 2 | 25 | 4 | 7 | 82.6 | 620,000 |
| 6* | SP342 | $C_{18}H_{37}OPO_xEO_yPO_zH$ | Bl | 50 | 30 | 80 | 6 | 81.5 | 600,000 |
| 7* | SP342 | $C_{18}H_{37}OPO_xEO_yPO_zH$ | Rm | 15 | 4 | 35 | 7 | 81.1 | 700,000 |
| 8* | SP342 | $C_{18}H_{37}OPO_xEO_yPO_zH$ | Rm | 6 | 120 | 20 | 6 | 80.8 | 730,000 |

Remarks
1) SP342: cellulose BAN240L: amylase
2) The configuration in Table 1 shows the added configuration how $EO_yPO_z$ is added, and Bl represents block configuration and Rm represents random configuration.
3) BO represents butylene oxide.
4) *Comparative Examples.

As is apparent from Table 1, the deinking agent of this examples permits the efficient removal of ink particles from pulp fiber so that the regenerated pulp having a high brightness degree and a low content of residual ink particles was observed to be provided.

EXAMPLE 8

The same procedures used in Example 1 were conducted except that the kind of an enzyme (amylase: BAN240L, product by Novo Bio-Industry Co., Ltd. was employed) and a surface active agents were altered. The result is shown in Table 1.

EXAMPLE 9–10

After cutting a high quality PPC waste paper (the ratio of the area is covered with ink is 12 wt. %) into pieces of 4×4 cm, the pieces were introduced into a pulper disintegrator, then an enzyme (cellulase: SP342, product by Novo Bio-Industry Co., Ltd was employed) in an amount of 0.2 wt. % and each compound listed in Table 2 in an amount of 0.2 wt. % respectively were mixed, warm water were added therein to control the pulp concentration to 5 wt. % and the heat treatment was conducted thereof at a temperature of 50° C. for 20 minutes. At that time, pH turned out to be 7. In addition, the produced pulp slurry was aged at a temperature of 50° C. for 60 minutes. Then the pulp concentration was controlled to 1.0 wt. % by diluting water therein. Followingly, the flotation treatment was conducted at a temperature of 43° C. Subsequently, the produced slurry was formed into a pulp sheet by the use of a TAPPI sheet machine. The ISO brightness degree and number of residual ink particles of the produced pulp sheet were measured. The results are shown in table 2.

TABLE 2

| No. | Enzyme | Surface active agent | Configuration | x (mol) | y (mol) | z (mol) | pH | Brightness degree (ISO, %) | Residual ink particles (number/m$^2$) |
|---|---|---|---|---|---|---|---|---|---|
| 9 | SP342 | $C_{18}H_{37}OPO_xEO_yPO_zH$ | Bl | 6 | 30 | 20 | 7 | 86.5 | 100,000 |
| 10 | SP342 | $C_{18}H_{37}OPO_xEO_yPO_zH$ | Rm | 6 | 22 | 14 | 7 | 86.3 | 110,000 |

As is apparent from Table 2, the deinking agent of the examples of the present invention permits the efficient removal of ink particles from pulp fiber so that the regenerated pulp having a high brightness degree and a low content of residual ink particles was observed to be provided.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, and all changes which come within the meaning and range of equivalency of the claims are intended to be embraced therein.

What is claimed is:

1. A method of deinking a waste paper comprising converting said waste paper to a pulp and contacting said pulp with an enzyme and a compound-represented by the following formula (2):

$$R^1O-(PO)_x-[(EO)_y-(AO)_z]-H \quad (2)$$

wherein $R^1$ represents alkyl group or alkenyl group having 8–24 straight or branched chain carbon atoms; PO represents propylene oxide unit; EO represents ethylene oxide unit; AO represents alkylene oxide unit having not less than three carbon atoms; x is an integer in the range of 2 to 20, z is an integer in the range of 10 to 50 and satisfy the following formula, $10 \leq x+z \leq 100$; y is an integer in the range of 15 to 50; PO is added in the form of a block configuration; and EO and AO are added in the form of a block or a random configuration, and the amount of said enzyme being in the range of 0.002 to 3 wt. % based on the dry weight of said waste paper and the amount of said compound represented by the formula (2) being in the range of 0.01 to 5 wt. % based on the dry weight of said waste paper.

2. The method for deinking according to claim 1, wherein the deinking is carried out at a pH ranging from 3 to 8.

3. The method for deinking according to claim 1, wherein the amount of an enzyme to be used ranges from 0.02 to 1 wt. % per dry weight of a waste paper.

4. The method for deinking according to claim 1, wherein the ratio of the enzyme to the ether compound represented by said general formula (2) ranges from 2:98 to 91:9 based on weight.

5. The method for deinking according to claim 1, further comprising a pulping stage, an aging stage and a flotation stage, wherein the deinking agent is added to at least one of the pulping stage, the aging stage and before the flotation stage.

6. The method for deinking according to claim 5, wherein the pulping stage is carried out at a pulp concentration ranging from 4 to 25 wt. %, at a temperature ranging from 20° to 70° C. and at a pH ranging from 3 to 8 while alkaline agent is further added.

7. The method for deinking according to claim 5, wherein the aging stage is carried out at a pulp concentration ranging from 10 to 30 wt. % and at a temperature ranging from 30° to 80° C. for not less than one hour.

8. The method for deinking according to claim 5, wherein the flotation stage is carried out by removing the detatched ink from the pulp slurry at a pulp concentration ranging from 0.5 to 2.5 wt. % and at a temperature from 20° to 50° C.

9. The method for deinking according to claim 1, wherein the enzyme is at least one selected from the group consisting of cellulase and amylase.

10. The method for deinking according to claim 1, further comprising at least one compound selected from the group consisting of polyoxy alkylene alkyl ether sulfate, alkylbenzene sulfonate, α-olefin sulfonate, fatty acid or its salt, alkyl phenol/alkylene oxide adducts, fatty acid/alkylene oxide adducts, fats and oils/alkylene oxide adducts, ester compound made by triethanol amine and fatty acid/alkylene oxide adducts, quaternized esther compound made by triethanol amine and fatty acid/alkyene oxide adducts, rosin acid/alkylene oxide adducts, formaline condensing agent of alkyl phenol/alkylene oxide adducts, monostearyl glyceride/alkylene oxide adducts, trigriceride/alkylene oxide adducts and pentaerythritol di fatty ester/alkylene oxide adducts.

* * * * *